Oct. 13, 1970 J. J. GOLEMBESKI 3,534,301

TEMPERATURE COMPENSATED INTEGRATED CIRCUIT TYPE NARROWBAND STRIPLINE FILTER

Filed June 12, 1967 7 Sheets-Sheet 1

INVENTOR
J. J. GOLEMBESKI
BY [signature]
ATTORNEY

Oct. 13, 1970 J. J. GOLEMBESKI 3,534,301

TEMPERATURE COMPENSATED INTEGRATED CIRCUIT TYPE NARROWBAND STRIPLINE FILTER

Filed June 12, 1967 7 Sheets-Sheet 3

Oct. 13, 1970 J. J. GOLEMBESKI 3,534,301

TEMPERATURE COMPENSATED INTEGRATED CIRCUIT TYPE NARROWBAND STRIPLINE FILTER

Filed June 12, 1967 7 Sheets-Sheet 6

United States Patent Office 3,534,301
Patented Oct. 13, 1970

3,534,301

TEMPERATURE COMPENSATED INTEGRATED CIRCUIT TYPE NARROWBAND STRIPLINE FILTER

John J. Golembeski, North Plainfield, N.J., assignor to Bell Telephone Laboratories, Incorporated, Murray Hill and Berkeley Heights, N.J., a corporation of New York
Filed June 12, 1967, Ser. No. 645,376
Int. Cl. H03h 7/04
U.S. Cl. 333—73 6 Claims

ABSTRACT OF THE DISCLOSURE

A stripline filter is formed from the combination of two dielectric wafers, each being coated on one side and on one end with a conductive layer. On the opposite side each is coated with a longitudinal conductive strip and a connecting pair of transverse conductive tabs. The wafers are superimposed with the respective tabs and strips aligned and in intimate contact. Temperature compensation is improved by the use of a terminating capacitor with a temperature coefficient that opposes the temperature coefficient of the filter structure proper and, additionally, by ensuring that the cross section of the conductive layer or ground plane on each wafer is substantially identical to the cross section of the longitudinal conductive strip on each wafer.

BACKGROUND OF THE INVENTION

Field of the invention

This invention relates to stripline filters and more particularly to temperature compensated filters of that type that are adapted for use in combination with thin film circuitry.

Description of the prior art

The current trend in VHF-UHF communication circuits is in the direction of hybrid integrated circuit technology owing to the significant advantages provided in terms of enhanced uniformity in fabrication and marked increase in compactness. These features are important in view of the strict limitations on parasitics and signal path lengths that are required when design parameters call for controlling high frequency phase shifts to within a fraction of a degree.

Despite the trend indicated, the filters employed in circuits operating in the VHF and UHF range are still typically based on cavity structures or coaxial transmission lines that employ significant capacitive loading. These filter structures are desirable because of their high intrinsic Q which provides a design tool that permits an advantageous trade-off between insertion loss and loaded Q. The very nature of such structures, however, precludes realization in terms of microelectronic or integrated circuit technology.

In the microwave field some advances have been made toward the utilization of filters that are compatible with integrated circuit techniques. Such filters are shown, for example, in U.S. Pat. 2,819,452, issued to M. Arditi et al. on Jan. 7, 1958. Heretofore, however, stripline filters have not met the stringent selectivity and temperature stability requirements of VHF-UHF filters of the type employed, for example, in high speed pulse code modulation (PCM) systems.

Accordingly, a general object of the invention is to improve the selectivity and temperature stability of stripline filters and to adapt such filters for compatible use with integrated, thin film circuitry in VHF-UHF communication systems.

SUMMARY OF THE INVENTION

The foregoing objects are achieved in accordance with the principles of the invention by a stripline filter formed from a unique combination of two dielectric wafers each of which is coated on one side and on one end with a conductive layer. On the opposite side each wafer is coated with a longitudinal thin film conductive strip and a connecting pair of transverse conducting tabs. The wafers are superimposed with the respective tabs and strips aligned and in intimate contact. The level of temperature instability typically associated with prior art devices is avoided or limited substantially by two distinct features of the invention. First, the stacking and bonding together of two symmetrical stripline wafers in opposed relation tends to cancel out the individual wafer flexure that would otherwise result from temperature changes. Secondly, temperature-caused flexure of each of the wafers is inhibited by depositing substantially equal amounts of conductive material on both sides of each wafer.

In accordance with the invention, the temperature stability of a stripline filter constructed in the manner indicated can be made virtually absolute by reducing the length of the filter to less than ¼ wavelength ($\lambda$) and connecting across the open end of the filter a terminating capacitor with a temperature coefficient opposite to that of the basic filter structure. Precise computational means have been devised to express the interrelation of the filter center frequency, the filter length, the dielectric constant of the stripline and the magnitude of the temperature compensating capacitor.

DETAILED DESCRIPTION

Figure 1:
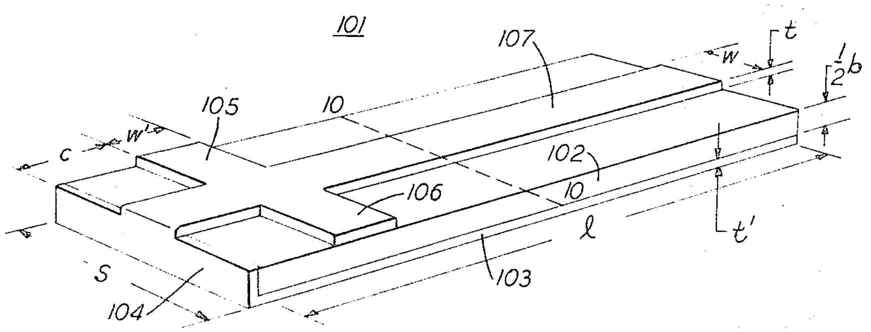
FIG. 1 is a sketch, shown in perspective of one layer of a stripline filter in accordance with the invention.

A filter in accordance with the invention includes a combination of two substantially identical wafers one of which 101 is shown in FIG. 1. The main body portion 102 is a nonconductive substrate. The material of the substrate should ideally be lossless and should exhibit no variation in length or dielectric constant with temperature changes. To ensure compatibility with integrated circuitry the material should also be suitable as a substrate for associated thin film circuit patterns. Additionally, it is desirable for the substrate to have a large dielectric constant. One material that approaches these requirements is alumina, available commercially as Coors AD995 aluminum oxide ceramic.

It should be noted at this point that all known materials are "non-ideal" in terms of the invention in that they are temperature dependent as to both length and dielectric constant. The principles of the invention, however, provide the means for offsetting the effects of the dependencies indicated and of approximating the ideal case to an extent dependent only on the prevailing state of the art in material fabrication technology.

The bottom surface of the wafer 101 is coated with a conductive film 103 which is extended around to cover one end 104. The top surface of the substrate 102 is covered in part by a longitudinal strip of conductive film 107 and by integral transverse connecting tabs 105 and 106. The conductive film may be formed by any one of a number of suitable means as by depositing a thin layer of copper, for example.

Figure 1A:
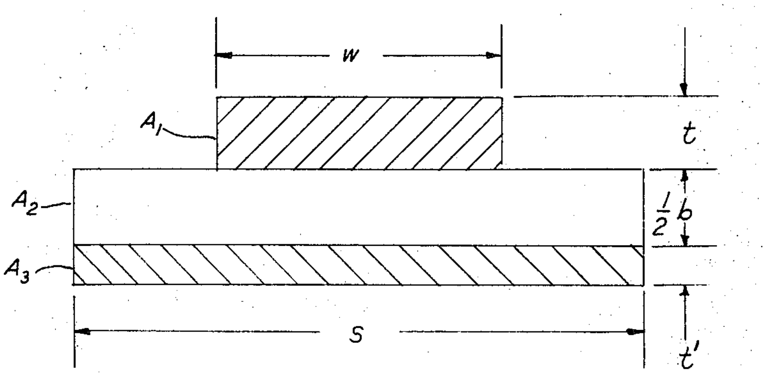
FIG. 1A is a cross-section view taken along the line 10—10 of the filter layer shown in FIG. 1.

In one illustrative filter, constructed in accordance with the principles of the invention to meet selected specifications, the physical dimensions were as follows:

| | |
|---|---|
| $l$=3.56 | $t$=.002 |
| $w$=.200 | $t'$=.002 |
| $w'$=.172 | $\frac{1}{2}b$=.080 |
| $c$=.203 | |

where the dimensions designating characters are as shown in FIGS. 1 and 1A and where all dimensions are in inches.

Figure 2:
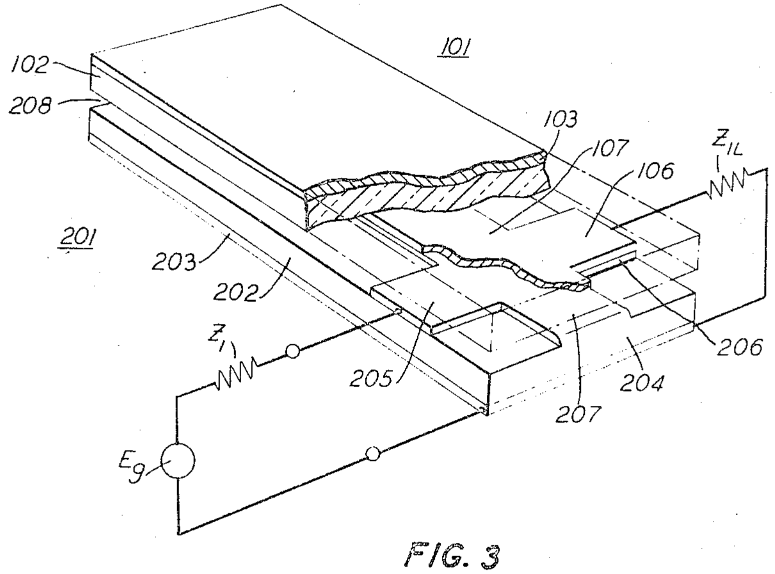
FIG. 2 is a sketch, shown in a perspective, partially cutaway view, of a filter in accordance with the invention in combination with an illustrative schematic circuit diagram of filter input and output circuitry.

An illustrative filter structure in accordance with the invention is shown in FIG. 2. As indicated, a first wafer 101 is placed in aligned juxtaposition with a second wafer 102 with the copper strips 107 and 207 in intimate contact. The tabs 105 and 106 are also in intimate contact with the corresponding tabs 205 and 206 on the substrate 202. Corresponding parts of the wafers 101 and 201 are similarly designated in that the substrate 102 corresponds to the substrate 202 and so on. The two wafers 101 and 102 may be held together, as shown, by any suitable means such as epoxy cement, for example. The gap 208 between the wafers 101 and 102 is shown with an exaggerated dimension in FIG. 2. If the illustrative dimensions shown in FIG. 1 are employed, the gap 208 would be equal to the thickness $t$ of the longitudinal strip 107 plus the thickness $t$ of the longitudinal strip 207, or .004".

There are two primary advantages in forming a stripline filter from two discrete portions in accordance with the invention as opposed to forming it as an integral unit. Frst, the fabrication process is simplified. Second and more importantly, temperature instability that would otherwise result from temperature-caused flexures in the filter structure is largely avoided owing to the opposing flexures and consequent flexure balancing that occurs. Even more exact flexure balancing may be achieved, or more precisely temperature-caused flexures may be inhibited to a substantial degree if the copper strip cross-sectional area $A_1$ is made substantially equal to the copper coating cross-sectional area $A_3$, which areas are shown in FIG. 1A.

Figure 3:
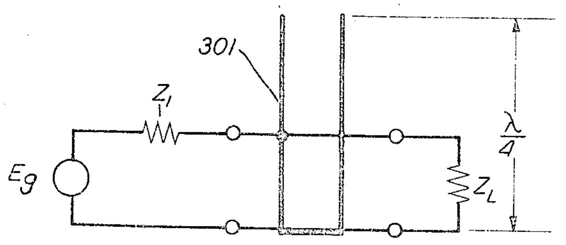
FIG. 3 is a schematic circuit diagram of a circuit including an uncompensated filter in accordance with the invention.

An equivalent circuit for a stripline filter in accordance with the invention is shown in FIG. 3. A signal source $E_g$ applies an input to the filter 301 by way of an impedance $Z_1$ and the filter output is applied across a load $Z_L$. The manner in which the filter 301 is physically connected to its input and output circuits is also shown in FIG. 2. As indicated, the filter structure is the equivalent of a resonant quarter-wave transmission line section with input and output connections made by way of the tabs 105, 106 and the corresponding tabs of the wafer 201. The construction and positioning of the tabs indicated near to the short circuited end of the filter constitute a unique feature of the invention and, as discussed in greater detail hereinbelow, permit a simple design tradeoff of insertion loss for Q.

Certain aspects of the invention are best disclosed in terms of a specific example of filter design. Assume, for example, that in a particular circuit, the requiremeans for a filter are the following.

Center frequency: 220 mHz.
Loaded Q: $\geq$80.
Insertion loss: $\leq$3 db.
Temperature coefficience: $\leq \pm 5 \times 10^{-6}/°$ F. of resonant frequency: ($\pm$.05%, $-20°$ C. to $+40°$ C.).

The filter is required to operate between 50 ohm terminations.

It is known that in any stripline filter the resonant frequency $f_o$ is a function of temperature in accordance with the following relation:

$$f_o(T) = \frac{c}{4\sqrt{\epsilon(T)l(T)}} \qquad (1)$$

where $c$=speed of light
$\epsilon$=relative dielectric constant
$l$=length of filter, end to end
T=temperature, ° C.

The fractional change in $f_o$ which results from a small temperature change is $$\frac{\Delta f_o}{f_o} \cong -\frac{1}{2}\frac{\Delta\epsilon}{\epsilon}\frac{\Delta l}{l} \qquad (2)$$

It is evident that the filter requirements indicated depend strongly on the $\epsilon$ and $l$ of the structure and hence on the properties of the ceramic substrate and on the properties of the copper film. The Coors AD995 aluminum oxide indicated above as an illustrative ceramic suitable for filters designed in accordance with the invention would be particularly desirable in a filter with the requirements noted owing primarily to its low dielectric loss or dissipation factor, commonly expressed as tan $\delta$. For this material, tan $\delta \cong$.00007 which in effect means that loss is substantially independent of frequency up to frequencies of a gigahertz. Additionally, tan $\delta$ for this alumina does not vary significantly with temperatures over the range $-20°$ C. to $+40°$ C. The dielectric constant $\epsilon$ is given as 9.6 at 25° C. and increases almost linearly over the specified temperature range, which may readily be compensated for in accordance with one of the features of the invention.

The influence of temperature on the length of the composite filter structure is found to be $$l(T) = l_o[1 + \alpha_T(T - T_o)] \qquad (3)$$

where $l_o$=length at temperature $T_o$
$\alpha_T$=thermal coefficient of expansion for the structure and $$\alpha_T = \frac{\alpha_1 + \alpha_2 \dfrac{A_2}{A_1 + A_3}\dfrac{E_2}{E_1}}{1 + \dfrac{E_2}{E_1}\dfrac{A_2}{A_1 + A_3}} \qquad (4)$$

where $\alpha_1$=coefficient of expansion of copper
$\alpha_2$=coefficient of expansion for alumina ceramic
$E_1$=Young's Modulus for copper
$E_2$=Young's Modulus for alumina ceramic
$A_1$, $A_2$, $A_3$=cross-sectional areas indicated in FIG. 1A.

The substitution of selected numerical values in Equation 4 gives the result that $\alpha_T=6.92\times10^{-6}/°$ C. and numerical substitution into Equation 2 produces the following temperature coefficient:

$$\frac{\Delta f_0}{f_0}=-8.3\times10^{-5}/° \text{ C} \qquad (5)$$

It is noted that in terms of the filter requirements assumed herein, the temperature coefficient expressed in Equation 5 is unacceptable and accordingly an uncompensated quarter wave filter constructed as indicated would not be sufficiently stable to meet the specifications over the required temperature range.

Figure 4:
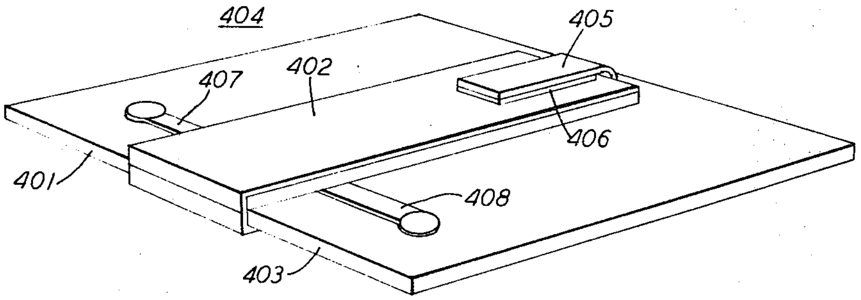
FIG. 4 is a sketch, shown in perspective, of a filter in accordance with the invention with one illustrative type of terminating, temperature-compensating capacitor and an extended substrate layer.

In accordance with the invention the temperature stability of the filter under consideration can be improved substantially by shortening the filter length and appending a terminating capacitor which has a temperature coefficient that opposes the temperature coefficient of the filter structure proper. A filter 401 of this construction is shown in FIG. 4. A wafer 402 of similar construction to the wafer 101 of FIG. 1 is superimposed on a second similar wafer 403. In this case, however, the wafer 403 is of extended lateral dimensions. The additional size of the lower dielectric slab or wafer 403, which is superfluous insofar as the filter is concerned, is virtually free from stray fields and is therefore appropriate as a substrate for thin film circuitry (not shown) that may be associated with the filter. This feature eliminates unwanted phase shifts and other distortions that might otherwise occur as the result of variations in propagation time caused by external leads. Simplification of overall design is another advantage of this feature.

Tabs 407 and 408 are brought out on the laterally extended portions of the wafer 403. A temperature compensating capacitor 404 is connected across the open end of the filter 401. The capacitor 404 is formed from a conductive strip 405 that is affixed to the center conductive strips (not shown) of the filter and then bent around the end of the wafer 402. A strip of dielectric material 406, such as polystyrene, for example, is sandwiched between the top copper coating of the wafer 402 and the conductive strip 405. The dielectric strip 406 may be bonded with any suitable adheshive on one side to the conductive strip 405 and on the other side to the copper clad top of the wafer 402. A schematic diagram of a circuit utilizing a capacitor 404 of the form shown in FIG. 4 is shown in FIG. 5.

Figure 5:
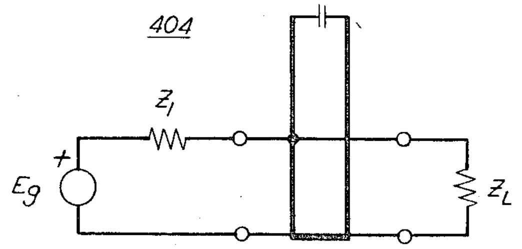
FIG. 5 is a schematic circuit diagram of an illustrative circuit including the filter shown in FIG. 4.

A transmission line of length $l$ which is open circuited at one end and terminated in a capacitor of magnitude C at the other end, as shown in FIGS. 4 and 5, resonates at a frequency $\omega_0$ and odd multiples thereof where:

$$\omega_0=\left[Z_0 C \tan\cdot\frac{2\pi l\sqrt{\epsilon}}{\lambda_f}\right]^{-1} \qquad (6)$$

where $\lambda_f$=wavelength in free space, and
$Z_0$=characteristic impedance of the resonant stripline.

The rate at which the resonant frequency of the filter varies with temperature can be found by evaluating the derivative:

$$\left.\frac{d\omega_0(T)}{dT}\right|_{T=T_0}=0 \qquad (7)$$

Substitution of Equation 6 into Equation 7 and simplifying terms leads to the following design equation:

$$\frac{\frac{4\pi l\sqrt{\epsilon}}{\lambda_f}}{\sin\frac{2\pi l\sqrt{\epsilon}}{\lambda_f}}=-\frac{\alpha_\epsilon+2\alpha_T}{2\alpha_c} \qquad (8)$$

where $\alpha_\epsilon$, $\alpha_T$ and $\alpha_c$ are the temperature coefficients of the stripline dielectric constant, length and terminating capacitor, respectively.

Although the capacitor 404 shown in FIG. 4 is convenient and well adapted for use with a filter structure in accordance with the invention, it should be noted that nothing in the foregoing theoretical analysis suggests that commercially available low loss discrete capacitors may not be used instead. Such capacitors may indeed the employed so long as the indicated design principles and requirements are followed.

Equation 8 specifies the filter length corresponding to a given temperature coefficient of the terminating capacitor, and Equation 6 establishes the magnitude of the terminating capacitor required for exact compensation. It is evident, therefore, that two distinct advantages are attained through capacitor termination in the manner described; namely that of thermal stabilization of center frequency and that of a reduction in filter size.

Thin film and integrated circuit technology typically requires that strict limitations be placed on the size of all component parts if overall packaging needs are to be met and if broad compatibility between different circuit portions is to be achieved. In this connection it is of some considerable significance, therefore, that by applying certain principles of the invention it is possible for the filter designer to minimize the substrate area assigned to the filter. The basic problem that confronts the designer is that of effecting a compromise between the theoretical case, in which the copper coatings or ground planes on the outside surfaces of the filter are assumed to be infinite and the practical realization in which finite dimensions are necessary, and optimum dimensions desirable. It has been found that approximately 99 percent of the field is contained within the region between the ground planes if the width $s$ of the filter is constrained to the following relation:

$$s=3b+\omega \qquad (9)$$

where $b$=total dielectric thickness (both wafers) and $\omega$=width of the longitudinal copper strip.

An unused degree of freedom exists in most filter applications where peak power or breakdown considerations are unimportant. Such freedom may be employed to determine the stripline dimensions for which the filter has minimum width (and therefore occupies minimum area on a substrate) subject to the contraints imposed by Equation 9, and also to stated loss or Q requirements. The thickness of the filter dielectric is considered to be of secondary importance compared to its width. The problem, therefore, becomes one of finding the minimum width consistent with the specified Q, or of maximizing the ratio $Q/s$ at a particular frequency.

Figure 13:
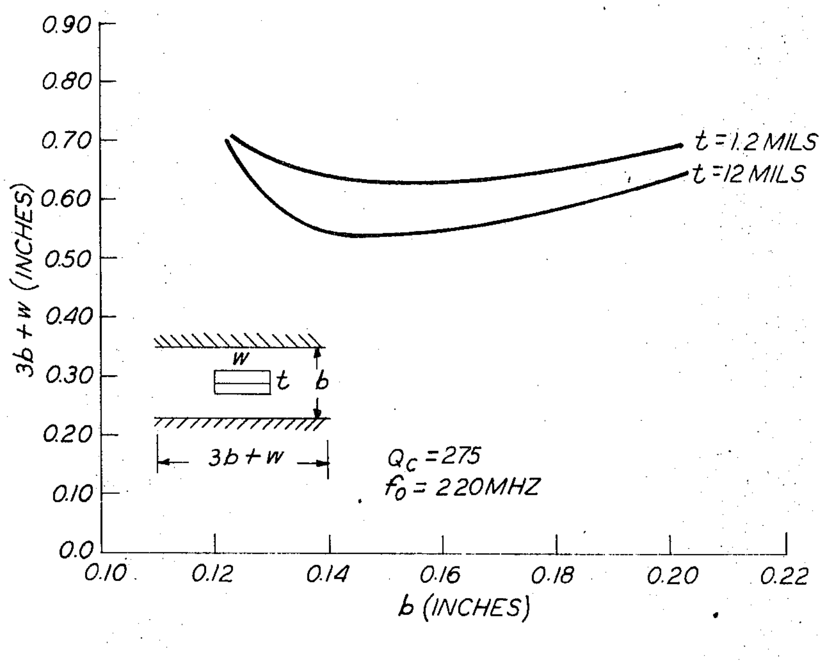
FIG. 13 is a plot of a function of center conductor width vs. dielectric thickness for different center conductor thickness.
Figure 11:
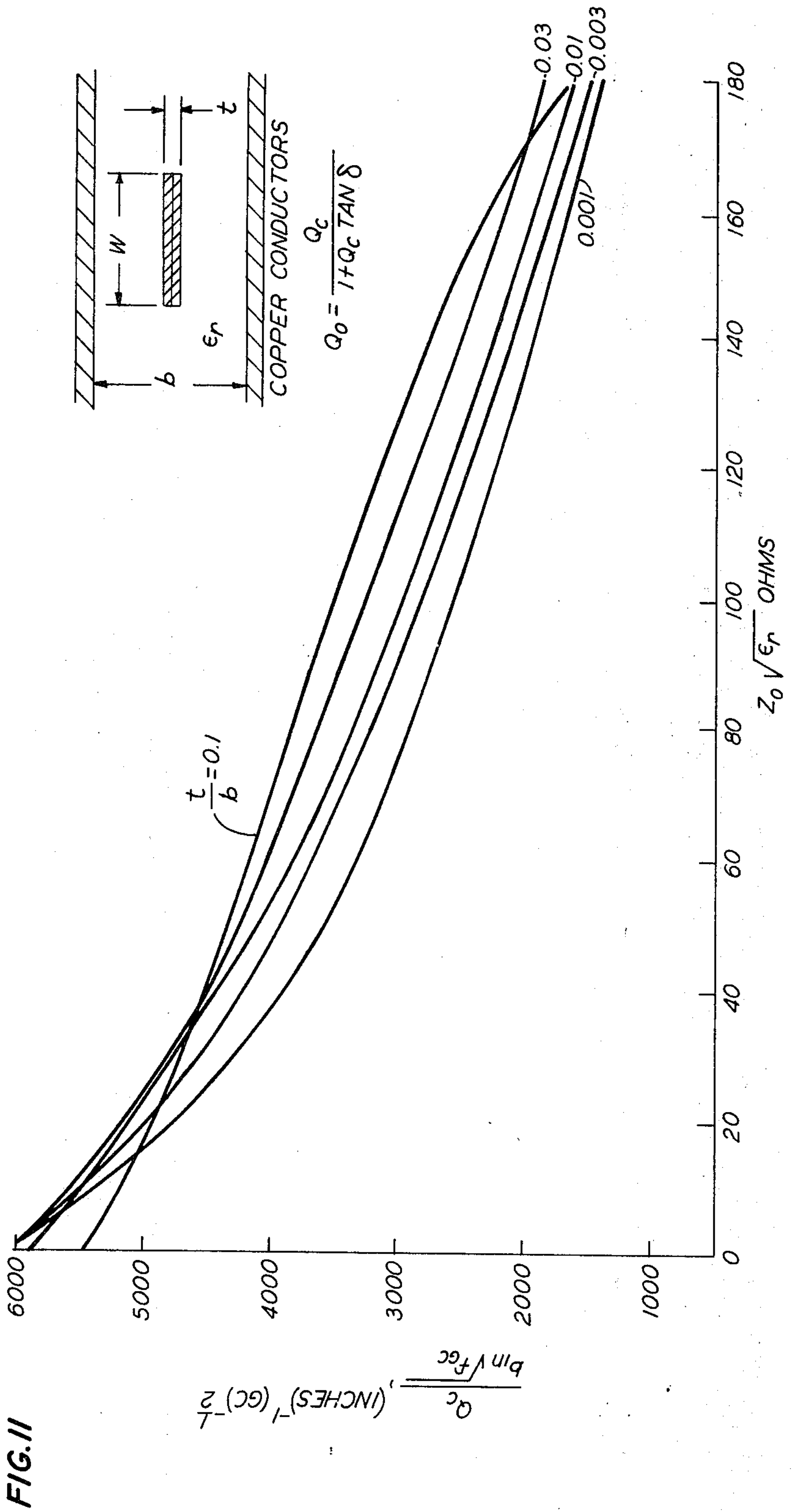
FIG. 11 is a plot of the theoretical Q of copper shielded stripline in a dielectric medium vs. output impedance for different ratios of center conductor and dielectric thickness.
Figure 12:
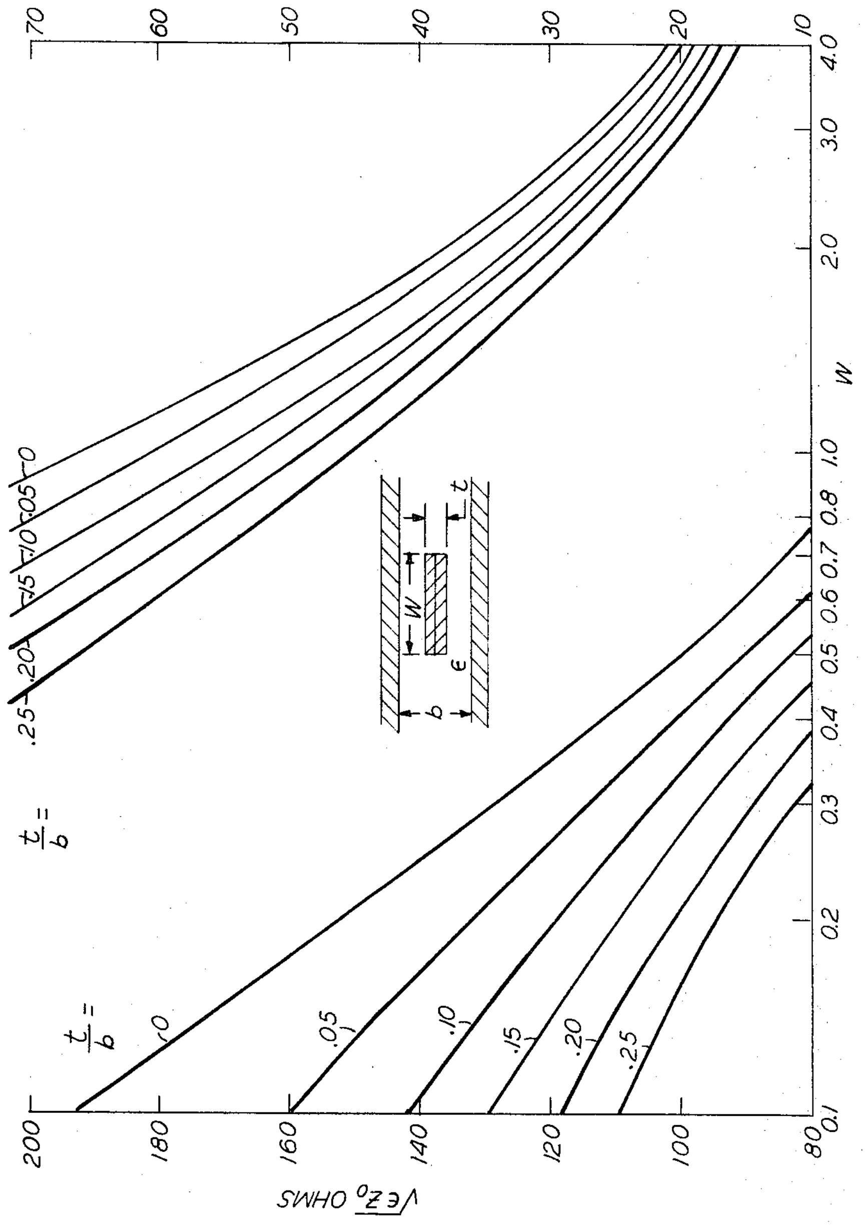
FIG. 12 is a plot of output impedance vs. the ratio of stripline filter center conductor width for various ratios of center conductor thickness to dielectric thickness.

The optimization suggested has been carried out in general terms and the results are presented in FIG. 11 where a family of curves of $Q_c$ vs. $Z_0$ has been plotted for various values of $t$ where $t$, as shown, is the total thickness of the two center longitudinal copper strips. The actual stripline dimensions are determined from the specification of Q and from the frequency by employing the self-explanatory curves plotted in FIGS. 12 and 13.

Independent calculations may be carried out to check the dimensional results obtained in the manner indicated above. Such calculations are reflected in the curves shown in FIG. 14 and these curves serve to verify the existence and location of an optimum design for minimum filter width or area on a substrate.

As indicated above, the loaded Q and insertion loss of a filter in accordance with the invention are determined by the point at which the tabs are affixed to the center conductor or longitudinal strips of the stripline. The point of attachment establishes the desired combination of loaded Q and insertion loss. It can be shown that the relation between loaded Q and insertion loss may be expressed as follows:

$$IL=-20\log\left[1-\frac{Q_L}{Q_o}\right] \quad (10)$$

where

IL=midland insertion loss in db
$Q_o$=unloaded Q of the filter
$Q_L$=loaded Q.

$Q_L$ is found to increase with a corresponding rise in the insertion loss. Design trade-off is accomplished in accordance with the invention by locating the tabs nearer the short-circuited end of the filter and the ability to satisfy both requirements simultaneously places a lower bound on $Q_o$. It is found that the specification of $Q_L=80$ and of an insertion loss of 3 db requires a $Q_o$ of 273. The unloaded Q, $Q_o$ is related to the loss in the copper and in the dielectric as follows:

$$Q_o=\frac{Q_c}{1+Q_c\tan\delta} \quad (11)$$

$Q_c$ is related to the copper loss and is the filter Q for the case of a lossless dielectric. Losses in the terminating capacitor are relatively minute as compared to ceramic dielectric losses and accordingly can be neglected.

Figure 8:
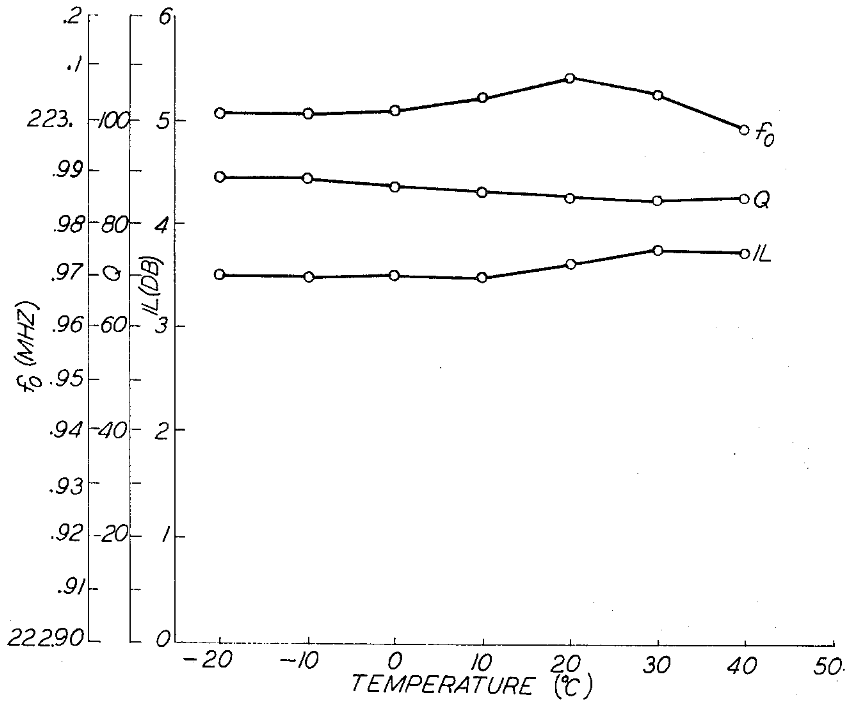
FIG. 8 is a plot showing the center-frequency temperature dependence of a filter in accordance with the invention.
Figure 9:
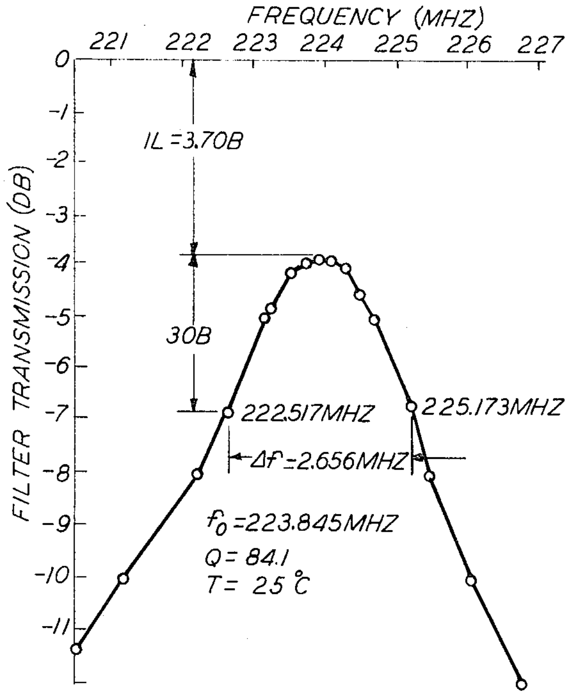
FIG. 9 is a plot of frequency response characteristics for a filter in accordance with the invention.
Figure 10:
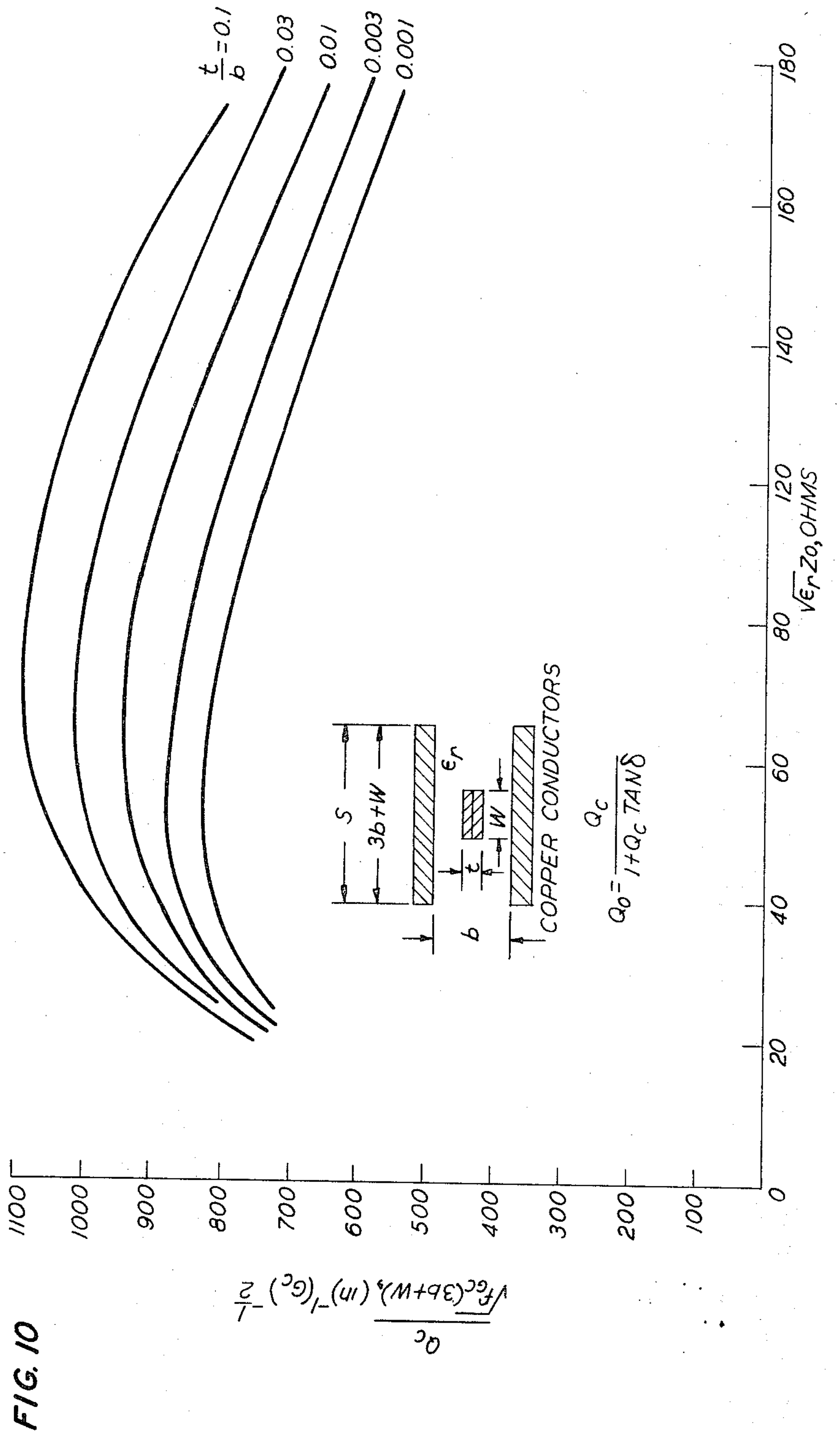
FIG. 10 is a plot of a $Q_c$ vs. $Z_0$ for various ratios of stripline center conductor thickness to dielectric thickness.

The frequency response and insertion loss characteristics of a filter constructed in accordance with the invention have been measured and the results are shown by the curves of FIGS. 8 and 9. The tabs for the input and output ports were positioned to provide for a loaded Q slightly greater than 80 (i.e., 84.1). The increase in insertion loss over the specification loss (from 3.0 db to 3.7 db) is considered unimportant and can readily be compensated for in associated circuitry. The compensating capacitor employed with the filter was polystyrene and had a value of 16 picofarads.

By a second series of measurements taken on the filter described immediately above, the temperature coefficient at resonant frequency was determined. An initial temperature cycling was carried out by varying the temperature between 20° C. and 40° C. The curves shown in FIG. 8 indicate the temperature dependence of the center frequency, Q and insertion loss.

Figure 6:
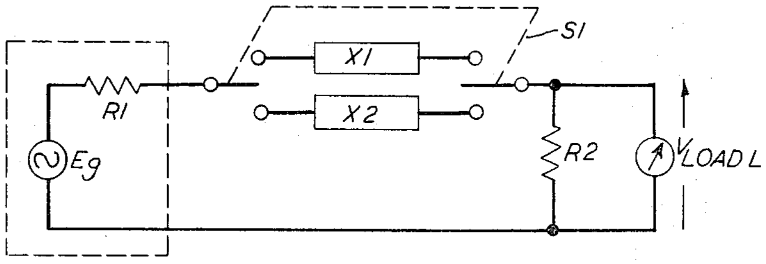
FIG. 6 is a schematic circuit diagram of a circuit employed to test filters in accordance with the invention.
Figure 7:
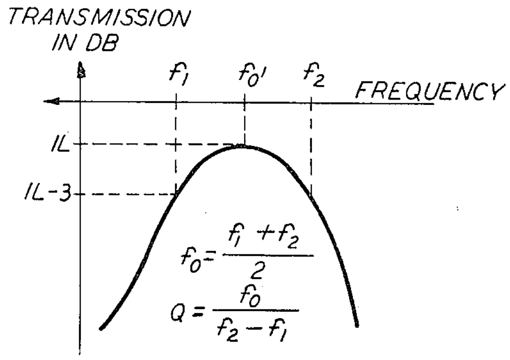
FIG. 7 is a plot of frequency vs. insertion loss for a filter in accordance with the invention.

The response curves of FIGS. 8 and 9 were determined by the substitution technique indicated by the schematic circuit diagram of the test circuit shown in FIG. 6. In FIG. 6 the filter $X_1$ being measured is compared to a calibrated, variable attenuator $X_2$. At a given frequency the switch S1 is alternated between the filter $X_1$ and the calibrated attenuator $X_2$, and the attenuator $X_2$ is varied until the losses in the filter $X_1$ equal those in the attenuator $X_2$. At that point the calibrated attenuator $X_2$ of course indicates the loss of the filter $X_1$ at the frequency of measurement. The peak frequency, $f_0$, cannot be determined with the precision that is possible in determining the cutoff frequencies $f_1$ and $f_2$. Accordingly, the peak frequency is taken as the mean of the upper and lower cutoff frequencies in order to permit greater accuracy in the evaluation of temperature dependence.

The dimensions of the filter designed and tested in accordance with the foregoing description are those listed above with reference to the filter shown in FIGS. 1 and 1A.

It is to be understood that the embodiment disclosed herein, including all circuit values and dimensions, is merely illustrative of the principles of the invention. Various modifications thereto may be effected by persons skilled in the art without departing from the spirit and scope of the invention.

What is claimed is:

1. A stripline filter comprising, in combination, two dielectric wafers each having a coating of conductive material on one side and on one end thereof serving as a filter ground plane, a longitudinal conductive strip and a connecting pair of transverse conductive tabs on the other side thereof serving as a transmission line, said coating, said strip and said tabs being substantially contiguous, said wafers being placed in juxtaposition with said strips and tabs in registry and in intimate contact with each other, whereby the portion of said contiguous coating on the ends of each of said wafers performs the dual functions of connecting said ground planes and providing a low resistance short circuit termination for said filter transmission line.

2. Apparatus in accordance with claim 1 including a capacitive element connected across the uncoated ends of said filter, the temperature coefficient of said element being equal and opposite to the uncompensated temperature coefficient of said filter.

3. Apparatus in accordance with claim 1 wherein an uncoated portion of one of said wafers is extended thereby to form a substrate for associated thin film integrated circuitry.

4. A stripline filter comprising, in combination, two dielectric wafers each having a coating of conductive material covering one side and one end thereof, a longitudinal conductive strip and a connecting pair of transverse conductive tabs on the other side thereof, said coating, said strip and said tabs being substantially contiguous, said wafers being placed in juxtaposition with said strips and tabs in registry and in intimate contact with each other, the cross-sectional area of said coating on said sides of said wafers being substantially equal to the cross-sectional area of said conductive strips, thereby to inhibit temperature induced flexure of said wafers and attendant temperature instability.

5. Apparatus in accordance with claim 1 wherein the amount of said conductive material on said one side is substantially equal to the amount of material in said conductive strip and tabs.

6. Apparatus in accordance with claim 1 wherein the normal circuit path through said filter is provided by said conductive tabs.

References Cited

UNITED STATES PATENTS

| | | | |
|---|---|---|---|
| 2,819,452 | 1/1958 | Arditi et al. | |
| 2,964,718 | 12/1960 | Packard | 333—73 |
| 2,922,968 | 1/1960 | Van Patten. | |
| 2,915,716 | 12/1959 | Hattersley | 333—73 |
| 2,648,823 | 8/1953 | Kock | 310—8.9 |
| 3,142,808 | 7/1964 | Gonda | 333—73 |

HERMAN K. SAALBACH, Primary Examiner

C. BARAFF, Assistant Examiner

U.S. Cl. X.R.

333—84